United States Patent [19]
Sundström et al.

[11] Patent Number: 5,544,033
[45] Date of Patent: Aug. 6, 1996

[54] DEVICES AND METHODS FOR SUPPRESSING OSCILLATIONS IN VOLTAGE CONVERTERS

[75] Inventors: Jan I. Sundström; Per A. Lindbeck, both of Göteborg, Sweden

[73] Assignee: Telefonaktiebolaget LM Ericsson, Stockholm, Sweden

[21] Appl. No.: 433,631

[22] Filed: May 2, 1995

[30] Foreign Application Priority Data

May 2, 1994 [SE] Sweden ................................ 9401488

[51] Int. Cl.$^6$ .................................................. H02M 1/12
[52] U.S. Cl. .................... 363/40; 363/21; 363/97
[58] Field of Search ................. 363/20, 21, 40, 363/55, 95, 97

[56] References Cited

U.S. PATENT DOCUMENTS 4,055,791  10/1977  Bland et al. ........................... 363/28
4,616,300  10/1986  Santelmann, Jr. ..................... 363/21
5,317,497   5/1994  Belek ..................................... 363/40

FOREIGN PATENT DOCUMENTS 049361   4/1982   European Pat. Off. .

Primary Examiner—Peter S. Wong
Assistant Examiner—Adolf Berhane
Attorney, Agent, or Firm—Burns, Doane, Swecker & Mathis, L.L.P.

[57] ABSTRACT

A device and a method for suppressing oscillations in a voltage converter including an inductor in the form of a transformer with an iron/ferrite core, a primary winding connected to a primary side, and a secondary winding connected to a secondary side, an input voltage being connected to the primary winding for generating an induced voltage in the windings, and also including an energy-absorbing element for suppressing voltage oscillations occurring in the windings. The energy-absorbing element is connected to and disconnected from any one of the windings.

9 Claims, 2 Drawing Sheets

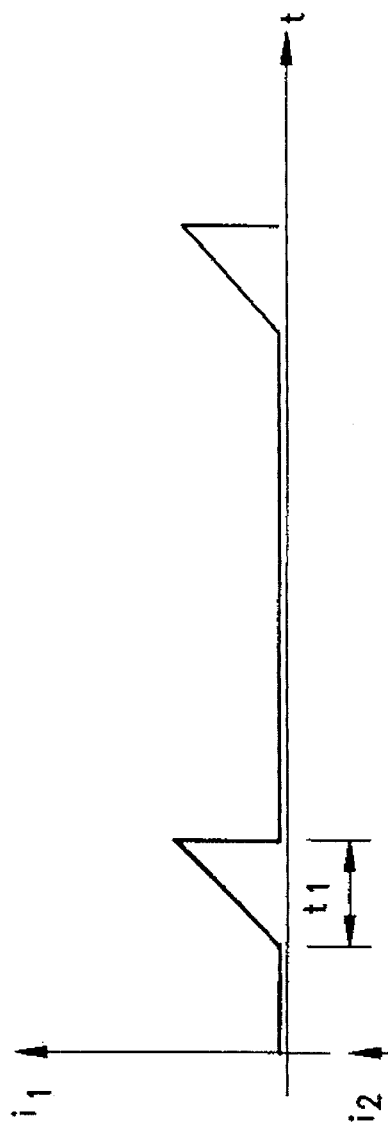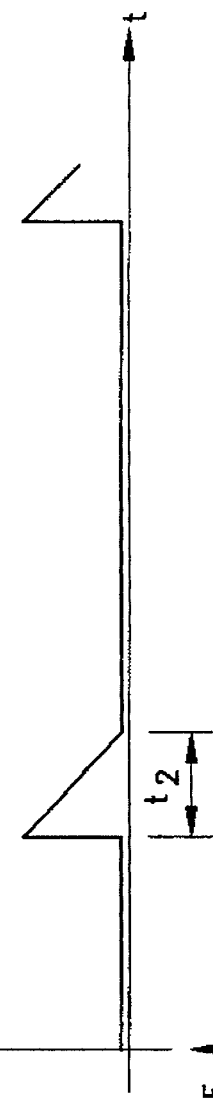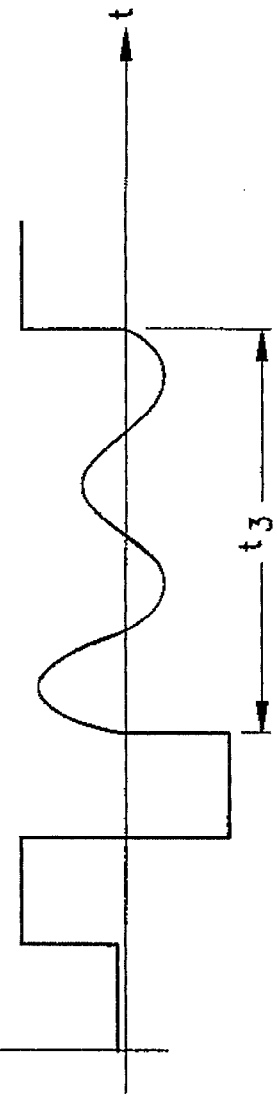

DEVICES AND METHODS FOR SUPPRESSING OSCILLATIONS IN VOLTAGE CONVERTERS

BACKGROUND

The present invention relates to a device and a method for suppressing oscillations in voltage converters. In particular, the invention is applicable to generation of high voltage by means of so-called "flyback" converters.

In the field of voltage conversion, the use of so-called "flyback" converters is previously known, which converters can comprise a primary winding and a secondary winding on a common iron/ferrite core. The voltage conversion follows a periodic progression which starts with the connection of a certain input voltage to the primary winding during a certain time period. This gives rise to a linearly increasing current in the iron/ferrite core, in connection with the fact that the magnetic energy in the iron/ferrite core increases. Thereafter, the input voltage is disconnected, after which the current through the primary winding is cut off and the magnetic energy is transmitted to the secondary side, which causes a current to be generated in the secondary winding. Thereafter, this progression is repeated in a periodic manner.

The control of the input voltage and thereby also the current through the primary winding is carried out by means of a controllable switching element, preferably in the form of a transistor which is connected in series with the primary winding. The switching on and off of the transistor is controlled by means of a pulse circuit, wherein a voltage regulation can be carried out by controlling the frequency and/or the pulse width of the pulses which are generated in the pulse circuit. When the transistor is switched on, a current flows through the primary winding, and when the transistor is switched off the input voltage will consequently be disconnected.

The change of magnetic energy in the iron/ferrite core when a current is fed through the primary winding causes an induced voltage to be generated in the windings. Due to the fact that the windings normally consist of a number of turns of wire wound in several layers, with insulation between the layers, unwanted stray capacitances will be generated parallel to the windings. This gives rise to a voltage oscillation, which can be troublesome since the instantaneous voltage across the primary and the secondary windings may influence the subsequent cycle in the periodic progression. During conversion to high voltage, this is particularly annoying since the secondary winding has many turns of wire, which leads to large stray capacitances.

One way of correcting such a voltage oscillation in an inductor/transformer is to connect some type of suppression circuit across one of the windings. In high voltage converters, when the windings comprise many turns, the unwanted stray capacitances become large. Consequently, in order to suppress the oscillations described above it is required that the suppression circuit has a low impedance. This causes large losses, which is a drawback.

A voltage converter of the so-called "flyback" type is known from the document U.S. Pat. No. 4,616,300, in which converter the stray capacitances are utilized in resonance with the inductance of the transformer in order to increase the coefficient of efficiency. Due to the fact that this converter should be allowed to be synchronized with an external frequency, the primary side of the transformer is provided with a "switched damper", the purpose of which is to absorb resonant energy in order to simplify the synchronization.

Thus, this document does not teach any device or method which relates to the problem according to the present invention, that is to prevent oscillations from occuring in the voltage control without giving rise to the losses which occur in a conventional suppression circuit.

SUMMARY

An object of the present invention is to suppress the oscillations which are generated due to stray capacitances in a transformer circuit for voltage conversion, with as low losses as possible. This object is accomplished in accordance with the present invention through the fact that the device comprises means for connecting and disconnecting the energy-absorbing element to at least one of the windings of the iron/ferrite core.

In particular, the invention relates to a device for suppressing oscillations in voltage converters, comprising an inductor in the form of transformer with a primary winding connected to a primary side and a secondary winding connected to a secondary side, a input voltage being connected to the primary winding for generation of an induced voltage in the windings, and also comprising an energy-absorbing element for suppression of voltage oscillations occuring in the windings, which device is characterized in that it comprises means for connecting and disconnecting the energy-absorbing element to the primary winding.

The invention also relates to a method for carrying out a suppression of oscillations of the above-mentioned type.

BRIEF DESCRIPTION OF THE DRAWINGS

The invention will be described in the following with reference to the annexed drawings, in which FIG. 2a–2c are diagrams which show the periodic operation of the invention.

DETAILED DESCRIPTION

Figure 1:
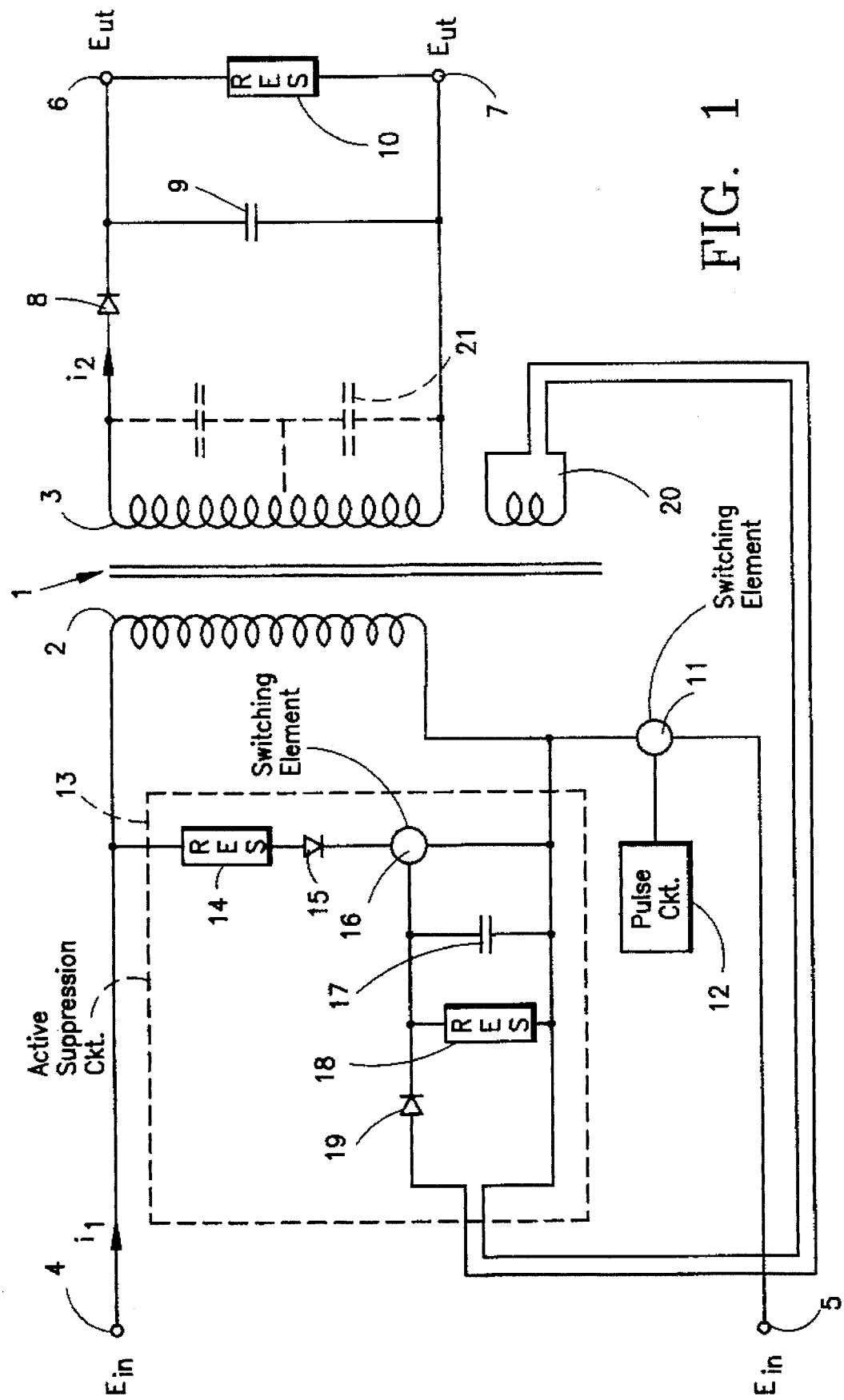
FIG. 1 shows in a schematic manner a circuit for a high voltage converter according to the present invention.

FIG. 1 shows in a schematic form a high voltage converter comprising an iron/ferrite core 1 with a primary winding 2 and a secondary winding 3. Furthermore, the high voltage converter is provided with two input terminals 4, 5 to which an input voltage $E_{in}$ can be connected, and two output terminals 6, 7 at which an output voltage $E_{out}$ can be supplied. The secondary side also comprises a rectifier 8 in the form of a first diode and a capacitor 9. A load can be connected at the output 6, 7, which load has been indicated symbolically by means of a resistor 10.

A first switching element 11, preferably in the form of a transistor, is arranged on the primary side. The switching element 11 is controllable by means of a pulse circuit 12, which is known per se and which is controllable as regards its pulse width and frequency. An active suppression circuit 13 is also arranged on the primary side, which circuit can be connected across the primary winding 2. The term "active" indicates that the suppression circuit 13, which will be apparent below, is controllable in such a way that it is connected to the primary winding when it is to suppress unwanted oscillations, and that it is disconnected when it is not needed, since otherwise it would consume energy unnecessarily.

The suppression circuit 13 comprises a resistor 14 which is arranged between a connection of the primary winding 2 and the anode of a second diode 15. The cathode of the second diode 15 is connected to a first connection of a second switching element 16 which, as well as the first switching element, preferably is a transistor. Furthermore, the suppression circuit 13 comprises a filter circuit consisting of a capacitor 17, a resistor 18 and a third diode 19, which filter circuit is connected across a second and a third connection of the second switching element 16, of which connections the second connection is a control electrode for the second switching element 16.

A third winding 20 is arranged on the iron/ferrite core 1, which winding operates as a control winding which controls the operation of the second switching element 16. The third winding 20 is connected to the second switching element 16 via the third diode 19, the capacitor 17 and the resistor 18, in accordance with that which is shown in FIG. 1.

The periodic operation of the invention will be described in the following primarily in connection with FIGS. 2a–2c in which FIG. 2a shows the current $i_1$ on the primary side, FIG. 2b shows the current $i_2$ on the secondary side and FIG. 2c shows the voltage which is induced in the transformer.

During a first time interval $t_1$, the first switching element 11 will be controlled to its switched-on, closed position by means of the pulse circuit 12. The duration of the time interval $t_1$ is determined by the pulse width of the pulses being supplied by the pulse circuit 12. If a certain input voltage $E_{in}$ is applied to the input terminals 4, 5, a current $i_1$ will flow through the primary winding 2 (see FIG. 2a). This current $i_1$, which increases linearly during the time interval $t_1$, causes a magnetic flux to be generated in the iron/ferrite core 1, which in turn causes an induced voltage E (see FIG. 2c) to be generated in the three windings 2, 3 and 20.

Furthermore, during the first time interval $t_1$ the control winding 20 (due to the choice of its polarity) controls the second switching element 16 to its switched-off position. This means that the active suppression circuit 13 is not connected in the circuit on the primary side during the first time interval $t_1$.

When the first time interval $t_1$ has expired, the pulse circuit 12 will control the first switching element 11 to its switched-off, open position, causing the current $i_1$ to stop flowing through the primary winding 2. The magnetic field which has been stored in the core 1 now forces a certain current $i_2$ to flow through the secondary circuit. The current $i_2$ will decrease linearly in accordance with that which is shown in FIG. 2b.

During the second time interval $t_2$, the voltage E which is induced in the windings 2, 3, 20 has a polarity which is reversed, compared with that during the first time interval $t_1$ (see FIG. 2c). During the second time interval $t_2$, the voltage across the control winding 20 will now control the second switching element 16 to its switched-on position. Normally, this would cause a current to flow through the second switching element 16 and the resistor 14. However, the second diode 15 will prevent current from flowing through this circuit. This means that during the second time interval $t_2$, the active suppression circuit 13 is not connected in the circuit on the primary side either.

During the time interval $t_3$, i.e. when the magnetic energy has been transmitted to the capacitor 9 of the secondary side, the first diode 8 ceases to conduct current. The primary and secondary windings 2, 3 now form an open circuit which is closed by means of the unwanted stray capacitances of the inductor, i.e. the transformer, which are indicated in a symbolical manner with reference numeral 21 in FIG. 1. An unwanted voltage oscillation (see FIG. 2c) occurs across the windings 2, 3. This oscillation is suppressed in accordance with the invention in the following manner. During the time interval $t_3$, when the polarity once again is reversed across the windings 2, 3 and the control winding 20, the suppression circuit 13 would normally once again be "cut off" and the control winding 20 would now force the second switching element 16 to its switched-off position. However, the third diode 19 prevents the voltage across the control winding 20 from switching off the switching element 16. At the same time, the capacitor 17 retains a positive voltage across the control electrode of the second switching element 16. Consequently, the first half period of the voltage oscillation which is caused by the stray capacitances (see FIG. 2c) will cause a current to flow through the primary winding 2 and through the load-absorbing resistor 14.

As long as the capacitor 17 retains the voltage to the second switching element 16, the latter will be in its switched-on position. As a consequence, the capacitance of the capacitor 17 and the resistance of the resistor 18 must be adapted to the described periodic sequence so that the second switching element 16 is kept in its switched-on position for a time period which is shorter than the third time interval $t_3$. Thereafter, the first switching element 11 will be controlled to its switched-on position, after which the periodic sequence starts again. The energy which is generated in the windings 2, 3 due to stray capacitances will in the main be absorbed by the resistor 14. The resistor 14 will only be connected to the primary winding 2 when it is needed, i.e. when it is intended to suppress said oscillations. For each period of the voltage converter, the losses in the resistor 14 become equal to the energy of the stray capacitances of the inductor/transformer. This gives an effective attenuation of the oscillations which are shown in FIG. 2c. On the other hand, no energy losses in the resistor 14 during the time intervals $t_1$ and $t_2$ will occur, due to the fact that the suppression circuit 13 is not connected but is instead kept passive. The resistance of the resistor 14 must of course be adapted to the current which flows through the primary winding 2, particularly during the third time interval $t_3$.

What is claimed is:

1. A device for suppressing oscillations in a voltage converter having an inductor with an iron/ferrite core, a primary winding, and a secondary winding, wherein an input voltage connected to the primary winding generates an induced voltage in the windings, and an energy-absorbing element for suppressing voltage oscillations occurring in the windings, the device comprising a control circuit for connecting and disconnecting the energy-absorbing element to at least one of the windings of the inductor;

wherein the control circuit comprises a third winding, arranged in connection with the iron/ferrite core, for controlling a state of the control circuit, a state of the third winding being dependent on the induced voltage in the primary and secondary windings;

the control circuit further comprises a switching element that is connected to the energy-absorbing element, operation of the switching element being controlled by the third winding;

whereby when an input voltage is connected to the primary winding during a first time interval, a first current is generated in the primary winding; when the input voltage is disconnected from the primary winding during a second time interval, a second current is generated in the secondary winding; and when the input voltage is kept disconnected from the primary winding during a third time interval, after which the first, second, and third time intervals are repeated periodically, the energy-absorbing element is connected to at least one of the primary and secondary windings during the third time interval.

2. The device of claim 1, wherein the energy-absorbing element is a resistor.

3. The device of claim 1, wherein the control circuit further comprises a diode for preventing current from flowing through the energy-absorbing element during the second time interval.

4. The device of claim 1, wherein the control circuit further comprises a diode for preventing the switching element from being switched off during the third time interval.

5. The device of claim 1, wherein the control circuit further comprises a timer circuit, adapted to the first, second, and third time intervals, for maintaining the switching element in a switched-on state for a time period shorter than the third time interval.

6. A method of suppressing oscillations in a voltage converter comprising an inductor having an iron/ferrite core, a primary winding connected to a primary side, and a secondary winding connected to a secondary side, and an energy-absorbing element for suppressing voltage oscillations occurring in the windings, comprising the steps of connecting and disconnecting the energy-absorbing element to at least one of the windings by means of a control circuit including a third winding, arranged in connection with the inductor, for controlling a state of the control circuit, a state of the third winding being dependent on the induced voltage in the primary and secondary windings, and further including a switching element connected to the energy-absorbing element, operation of the switching element being controlled by the third winding; wherein an input voltage is connected to the primary winding during a first time interval whereby a first current is generated in the primary winding; the input voltage is disconnected from the primary winding during a second time interval whereby a second current is generated in the secondary winding; the input voltage is kept disconnected from the primary winding during a third time interval, after which the first, second, and third time intervals are repeated periodically, whereby the energy-absorbing element is connected to at least one of the primary and secondary windings during the third time interval.

7. The method of claim 6, wherein the input voltage is connected to the primary winding via a controllable element which is controlled to a switched-on position during the first time interval and to a switched-off position during the second time interval and the third time interval.

8. The method of claim 6, wherein current is prevented from flowing through the energy-absorbing element during the second time interval by a diode included in the control circuit.

9. The method of claim 6, wherein during the third time interval, a voltage to the energy-absorbing element is maintained so that it remains in a switched-on position by means of a capacitor included in the control circuit and arranged to be charged during the second time interval, and a diode arranged to prevent discharging of the capacitor.

* * * * *